United States Patent Office 2,780,091
Patented Feb. 5, 1957

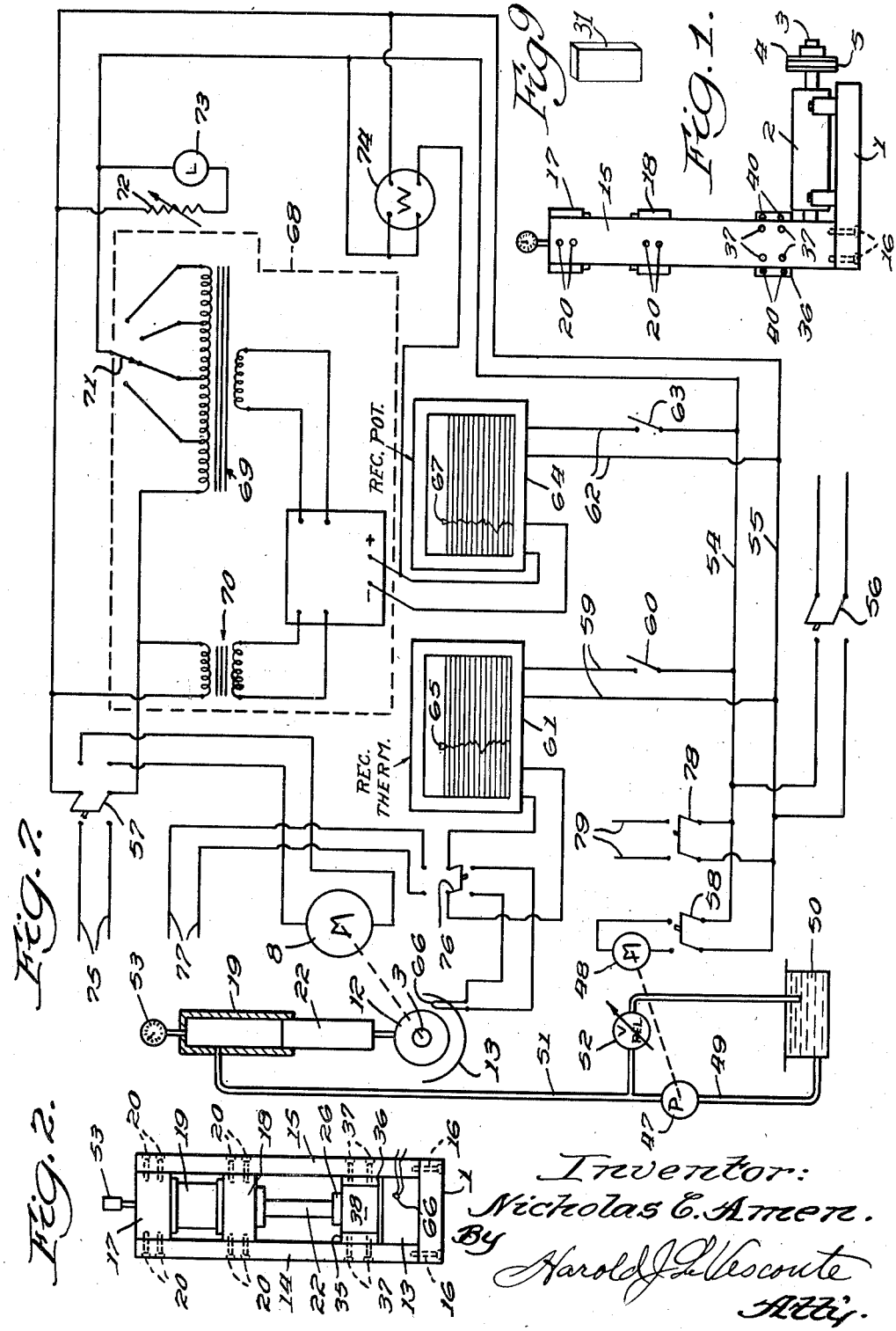

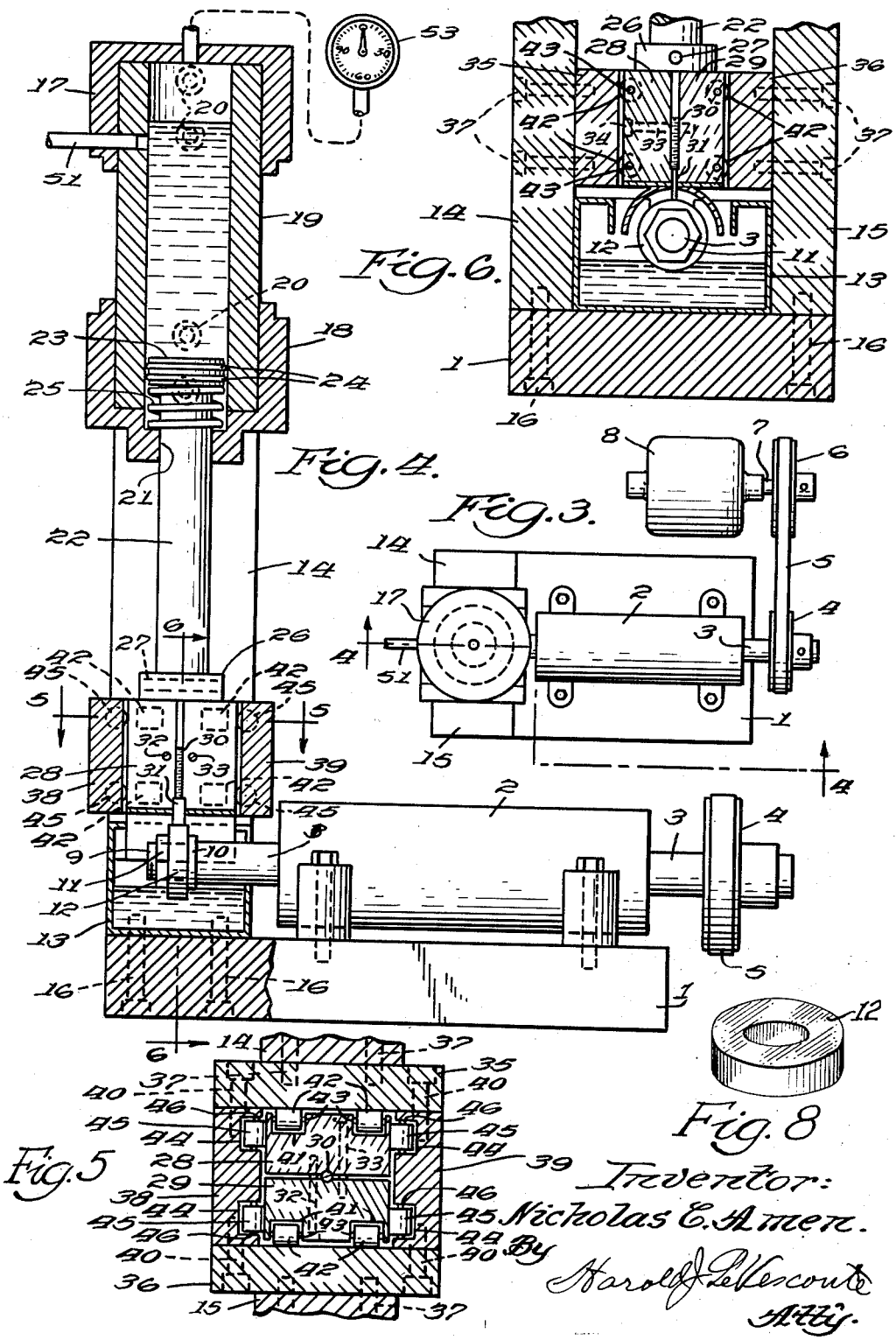

2,780,091
BEARING AND LUBRICANT FRICTION EVALUATING APPARATUS

Nicholas C. Amen, Glendale, Calif.

Application November 20, 1953, Serial No. 393,255

4 Claims. (Cl. 73—9)

This invention relates to testing apparatus and more particularly to apparatus for determining the performance of various bearing materials separately or in combination under varying degrees of bearing pressure and surface speeds and with or without lubricants as well as to determine the lubricating efficiency of different lubricating compounds with different bearing materials and under different surface speeds and bearing loads to the end that for any given bearing condition, the best bearing materials and the best lubricant therefor can be determined as well as to determine whether any new lubricating compound is more efficient in any respect than a compound presently regarded as satisfactory.

The principal object of the present invention is to provide a means by which practically every problem relating to the reduction of the coefficient of friction between relatively moving bearing surfaces may be accurately, quantitatively determined whether the problem relates to the lubricant employed, the surface speed, the materials employed for bearing surfaces, the permissible bearing loads for most efficient lubrication, or the amount of wear of bearing surfaces to be normally expected under any given condition.

Another object of the invention is to provide an apparatus for accurately, quantitatively determining and recording values representing the coefficient of friction between two relatively moving bearing surfaces and variations in such values deriving from changes in the speed or the lubricant employed or in bearing pressure, or in the materials composing the surfaces being subjected to test.

A further object of the invention is to provide an apparatus of the above character which is so constructed and arranged that the extent of wear under given bearing conditions can be determined.

Still another object of the invention is to provide a bearing surface testing machine in which the bearing pressure is derived from hydraulic pressure applied under conditions and by means effecting a constant p. s. i. value.

A still further object of the invention is to provide an apparatus under which the relative lubricating efficiency of different lubricants under a given condition of bearing material and load may be accurately compared.

Still another object of the invention is to provide an apparatus under which the resistance to wear of various combinations of bearing materials under given loads, speeds and lubrication may be accurately compared.

With the foregoing objects in view, together with such additional objects and advantages as may subsequently appear, the invention resides in the parts, and in the construction, combination and arrangement of parts disclosed, by way of example in the following specification of certain modes of execution of the invention; reference being had to the accompanying drawings which form a part of said specification and in which drawings:

Fig. 1 is a reduced scale side elevation of a testing machine embodying one form of the invention, Fig. 2 is a front elevation of the machine shown in Fig. 1, Fig. 3 is an enlarged top plan view of the machine shown in Figs. 1 and 2, Fig. 4 is a further enlarged side elevation with a portion thereof being shown in section as viewed on the line 4—4 of Fig. 3, Fig. 5 is a transverse sectional view taken on the line 5—5 of Fig. 4, Fig. 6 is a fragmentary front elevation taken on the line 6—6 of Fig. 4, Fig. 7 is a circuit diagram of the operating and performance recording means associated with and forming a part of the invention, and Figs. 8 and 9, are, respectively, perspective views of a representative test ring and test bar used in the machine.

Referring to Figs. 1 through 7, the testing machine component of the apparatus comprises a flat base 1 on which is mounted a bearing block 2 carrying a shaft 3. At one end the shaft 3 carries a pulley 4 adapted to be connected by suitable means as by belt 5, to a pulley 6 on the shaft 7 of an electric motor 8. The other end of the shaft 3 projects beyond the end of the bearing block 2 and is provided with a test ring holding mandrel portion 9 backed up by a flange 10 and the end of the shaft is threaded to receive a nut 11 by which a test ring 12 is clamped on the mandrel portion 9 and against the flange 10. The base 1 extends beyond the end of the bearing block 2 and beneath the portion of the shaft 3 carrying the test ring 12 and supports a removable reservoir 13 in which the lubricant compound to be used in a test is placed for contact with the outer periphery of the test ring as it is rotated with the shaft 3. For convenience in terminology, the portion of the machine as viewed looking toward the end of the shaft carrying the test ring will be called the front of the machine.

The front end of the base 1 at either side of the shaft 3 carries a pair of vertical members 14 and 15 secured thereto by suitable means such as screws 16; said members at their upper ends securing the upper and lower heads 17 and 18 of a hydraulic cylinder 19 between them by screws 20; said cylinder being disposed vertically with its axial line intersecting the axial line of the shaft 3 at the mid length of the test ring 12. The lower head 18 of the cylinder 19 is provided with a guide bore 21 for the piston rod 22 which within the cylinder 19 carries a piston head 23 provided with gasket means 24 engaging the inner walls of the cylinder 19. Below the piston head 24 and surrounding the piston rod 22 within the cylinder is a compression spring 25 of such strength as to just support the piston rod and head and the test bar carrying means so that any pressure exerted within the cylinder against the piston head will be exerted in full in the engagement between the test bar and test ring as will be later discussed in more detail.

The test bar carrying means comprises a collar 26 detachably secured to the lower end of the piston rod 22 by a cross pin 27; said collar at its lower face having fixed thereto clamp blocks 28 and 29 which as best shown in Figs. 5 and 6, are slightly spaced apart along a line parallel to the axis of the shaft 3. At the mid point of their meeting faces the clamp blocks are mutually threaded to receive a backup screw 30 to engage the upper end of a test block 31 clamped between the clamp blocks by screws 32 and 33 each of which is provided with a head 34 recessed in the outer side surface of one of the blocks and threadedly engages the other block as best shown in Fig. 5. The test block carrying head comprising the clamp blocks 28 and 29 and the associated backup and clamp screws is rectangular in plan and is guided in a guide way comprised by side plates 35 and 36 secured to the vertical members 14 and 15 by screws 37 and end plates 38 and 39 secured between the ends of the side plates 35 and 36 by screws 40. Adjacent their corners the outer side surfaces of the clamp blocks 28 and 29 are provided with recesses 41 in which roller bearings 42 are mounted on pins 43; said roller bearings projecting slightly beyond the surface of the bearing blocks and engaging the inner faces of the side plates 35 and 36. The end plates 38 and 39 are likewise provided with recesses 44 adjacent each corner thereof in which roller bearings 45 are mounted on pins 46; said bearings projecting slightly beyond the face of the end plates 38 and 39 and engaging the end surfaces of the clamp blocks 28 and 29. By this means the clamp blocks and test bar are guided for reciprocatory movement with a minimum amount of friction while resisting the side thrust thereon from the engagement of the end of the test bar with the rotating test ring.

Referring to Fig. 7 there is shown one mode of applying hydraulic pressure to the piston head 23 and through it to the engagement of the test bar with the test ring. The illustrated means comprises a pump 47 driven by a motor 48 said pump having an intake conduit 49 connected to a reservoir 50 and a discharge conduit 51 connected to the upper end of the cylinder 19. A variable pressure relief valve 52 is connected to the conduit 51 and to the reservoir 50 and a pressure indicating gauge 53 is connected to the upper end of the cylinder 19 above the point of entry of the conduit 51; the upper portion of the cylinder 19 and the space within the gauge 53 constituting an air dome. When the pump 47 is operated, it will deliver fluid into the cylinder 19 until a pressure is built up equal to that at which the relief valve 52 is set at which time excess fluid will be diverted by the relief valve back to the reservoir. The air cushion within the air dome portion of the cylinder will serve to absorb any slight variations in the volumetric delivery of fluid as well as slight vertical movements deriving from eccentricity of the test ring or roughness in the surface thereof without appreciable change in the imposed p. s. i. value. Assuming, by way of example, that the area of the piston head is one square inch and that the test block is $\frac{1}{32}''$ thick by $\frac{1}{4}''$ wide in its end dimensions, the ratio of the areas is 128:1 and that each pound of pressure registered on the gauge 53 is equivalent to 128 pounds of pressure per square inch applied to the surface of the test ring by the end of the test block. It is obvious that by changing the relative sizes of the cylinder and test block, machines can be constructed to effect any desired bearing pressure and it is obvious that by adjustment of the relief valve, the pressure may be varied at will during a test run where the effect of increasing pressure is the factor under investigation. It is obvious also that instead of the direct reading gauge illustrated, a recording gauge may be used.

Referring further to Fig. 7, the operating and controlling circuit includes main leads 54 and 55 connectable by a switch 56 to a source of alternating current. The leads 54 and 55 are connected through switches 57 and 58 to operate the motor 8 which rotates the test ring and the pump motor 48, respectively. A pair of leads 59 with an interposed switch 60 connects the main leads to the chart traversing motor of a recording thermometer 61 and another pair of leads 62 with an interposed switch 63 is connected to the chart traversing motor of a recording potentiometer 64. The scribing element 65 of the recording thermometer 61 is electrically connected to a thermocouple 66 disposed within the reservoir 13 and in close proximity to the periphery of the test ring whereby the temperature of the lubricant and of the surface of the test ring during a test is recorded.

The scribing element 67 of the recording potentiometer 64 is electrically connected to a power input means generally indicated at 68 which translates heat derived from resistance elements heated by currents developed in the secondary windings of transformers 69 and 70 in the main leads 54 and 55 into a variable direct current in proportion of the power demand on the main leads during a test. Devices of this character are available on the open market as standard equipment and further detailed description is not deemed necessary. The primary winding of the transformer 69 is connected in series in the lead 54 and includes a switch 71 by which the number of turns in the winding may be varied in equal increments. The primary winding of the transformer 70 is connected in parallel across the leads 54 and 55 between the motor controlling switch 57 and the primary coil of the transformer 69. Additionally, a variable resistance 72 is connected in parallel across the leads 54 and 55 with a further resistance in the form of a lamp 73 connected in series with the resistance 72; the total resistance of the resistance 72 and the lamp 73 being substantially equal in effect to the effect of the movement of the switch 71 from one point to an adjacent point and thereby provides a fine adjustment in addition to adjustment by means of the coarse adjustment attained by the switch 71. Additionally, a wattmeter 74 may be connected to the leads 54 and 55 from which the total power consumption during a test or a series of tests can be determined.

Assuming that a test is to be run and that the desired test bar and test ring are placed in the device together with the lubricant, if any, the motor 48 is first started and the valve 52 adjusted until the desired pressure is registered on the gauge 53. The motor 8 driving the test ring is then started as well as the two chart driving motors and the position of the potentiometer scriber on its chart is noted and suitable adjustment of the switch 71 and resistance 72 is made to bring the scriber to the left hand side of the chart in order that the full width of the chart may be available for recording purposes. The test then proceeds with either the bearing pressure load being increased by increments or gradually or by noting the performance under a given bearing pressure as the particular test may require. If the test is to determine the efficiency of a given lubricant the bearing pressure load may be increased gradually until a point is reached at which the lubricant fails; similar tests being then conducted with other lubricating compounds. If the test is to determine the performance of certain bearing materials, the test ring and test bar will be formed of those materials and the performance noted under conditions of comparable bearing speed and pressure. The extent of wear can be determined by measurement of the diameter of the test ring and of the length of the test bar before and after a particular test and the amount of wear can then be accurately predicted for a given bearing construction. If speeds are the subject of the inquiry, the surface speeds of the test ring may readily be varied by the use of suitable pulleys on the shaft 3 and the shaft 7 of the motor. Where the apparatus is to be used extensively for the investigation of the effect of varying speeds, the illustrated belt and pulley drive may, of course, be replaced by one of the many types of infinitely variable driving mechanism that are available.

In recent years there has been an increasing use of so-called "dry lubricants" comprising surface materials or compounds applied to the bearing surfaces and having a very low coefficient of friction. It is obvious that by correspondingly preparing the surfaces of the test rings and test bars, the efficiency of such surfaces and the limits of practical use of such surfaces can readily be determined both with respect to bearing pressure and surface speeds. Under those conditions, the only function of the reservoir would be to hold the thermocouple 66 in close proximity to the test ring surface and fluid lubricant would be omitted. Where the subject of investigation is the general lubricating efficiency of various lubricants, it is preferred that the test ring and test bar be of steel of equal hardness to provide a suitable standard for that purpose. At desired times during a test, the current consumption may be noted on the wattmeter and recorded or if desired, the illustrated wattmeter may be replaced by a recording wattmeter although experience has not indicated that that more expensive instrument is necessary. Generally, any series of tests will require only one setting of the switch 71 and resistance 73 so that all potentiometer chart data will be directly related enabling direct comparison. If adjustment should be necessary, the notation of the extent of the adjustment will enable the charts to be correlated for proper comparison.

The graphs of the recording thermometer during the tests are useful in determining the point of breakdown of a lubricant or a bearing surface due to friction generated heat incident to the various tests.

Thus, it will be seen that practically every problem relative to bearing conditions and lubricants therefor can be investigated with a single apparatus under conditions approximating those proposed for given installations or in which the permissible limits of speed or bearing pressure or both are to be determined or the suitability of certain proposed bearing materials under given conditions.

Referring again to Fig. 7, attention is called to the fact that the switch 57 controlling the motor 8 is a double throw switch connecting the leads 54 and 55 to the motor 8 or to leads 75. The leads 75 may extend to a similar motor operating other similar test equipment so that two separate test devices may be operated optionally on the same recording equipment. The leads connecting the thermocouple 66 to the recording thermometer 61 likewise include a double throw switch 76 which may afford connection with the thermocouple of the second testing device through leads 77. Also a switch 78 is provided for optional connection and operation of the pump motor of the second testing apparatus through leads 79. This arrangement is desirable in installations in which testing devices for different ranges of capacity are employed and for which the duplication of the recording portion of the invention is not required.

In making accurate, quantitative tests relative to lubrication and bearing performance, the primary essential is that the bearing pressure shall be accurately known and applied. In those tests other than those in which the objective is the breakdown point of the bearing surface or of the lubricant through gradually increased bearing pressure, it is essential that the bearing pressure be maintained at the selected value within a tolerance of not more than 2% plus or minus. Likewise, in the breakdown tests, it is essential that the pressure existing at the breakdown point be known within the same tolerance.

Preferably, in end section, the test bar is equal in width to the test ring surface contacted thereby and is of the least possible thickness consistent with resistance to lateral deflection due to the lateral force imposed thereon by the rotating test ring to the end that the total contact surface of the test bar may be calculated as the cross-sectional area thereof and so that any increase in the actual contact surface due to the convex curvature formed in the end of the test bar by contact with the test ring will be so small as to be negligible. In the illustrated embodiment, a hardened steel test bar $\frac{1}{32}''$ thick is satisfactory, but for softer steel or for non-ferrous metals, this dimension may have to be increased dependent on the imposed bearing pressure load and the surface speed of the test ring. To the end that the force shall be applied uniformly, the test bar is forced against the test ring in a straight line since any pivotal mounting of the test bar holding means would present the test bar at gradually changing angles as the test bar wore down with resultant variation in the area contacted and consequent change in the p. s. i. value, assuming a constant imposed load, and such variations would render the test valueless except for mere qualitative purposes.

In those tests which are non-destructive in character, the temperature indicating means is valuable in indicating the temperature at which the lubricant reaches a fluidity affording maximum lubricating efficiency under a given condition of materials, surface speed and bearing pressure. In general, in such tests, the friction indicated by the power input requirement rises at a decreasing rate of increase and finally reaches a point of stability indicated by the scribing of a vertical line on the potentiometer chart. At the same time the thermometer chart scribes a generally corresponding curve also terminating in a vertical line indicating a stable condition. From a study of the charts, the heat which may be expected to be generated by the bearing condition under consideration can be determined and questions relative to heat dissipation by the proposed bearing can be accurately resolved.

Prolongation of the above-described test may result, if the temperature should be near the limit for the lubricant, in a sudden increase in temperature and power input requirement deriving from the evaporation from the lubricant of some fraction of its composition or from the decomposition thereof with resultant loss of its initial lubricating qualities. These modes of use of the device are cited to further indicate the great versatility of the device in the investigation of problems relating to bearings and their lubrication.

In view of these considerations, the invention is not to be deemed to be limited to the exact forms of execution above disclosed by way of example, but it will be understood that the invention includes as well all such changes and modifications in the apparatus and the component parts thereof as shall come within the purview of the appended claims.

I claim:

1. In a device for testing bearing materials and lubricants, a base, a rotatable shaft mounted on said base, power means for driving said shaft, a test ring having an outer peripheral surface comprising a bearing material surface to be tested detachably fixed in coaxial relation on said shaft, a test bar having an end surface comprising a material to be tested in conjunction with said ring surface disposed with said end surface in engagement with said ring surface and movable toward and away from said ring surface in a line extending radially of the axis of rotation of said shaft, clamp means gripping said test bar, guide means engaging said clamp means constructed and arranged to confine movement of said clamp means to a path parallel to said radial line, and means for imposing a predetermined load on said test bar comprising a hydraulic cylinder disposed above said clamp means, a piston in said cylinder, a piston rod extending from said piston downwardly through the lower end of said cylinder to said clamp means, an air dome portion in the upper end of said cylinder, a source of fluid supply, a pump interposed between said supply and said cylinder operative to deliver fluid under pressure to said cylinder, and a relief valve interposed between said pump and said cylinder and having a bypass lead to said supply.

2. A testing device as claimed in claim 1 including means for varying the pressure imposed by said pump through adjustment of said relief valve, and means for indicating the power input required to rotate said shaft and test ring against the resistance imposed by said test bar at different pressures.

3. A testing device as claimed in claim 1 including spring means opposing said piston, piston rod and said clamping means to the extent of the weight thereof so that in the absence of fluid pressure, the pressure of said test bar against said ring will be substantially zero.

4. A testing device as claimed in claim 1 including a compression spring disposed in said cylinder and reacting between the lower side of said piston and the lower end of said cylinder effective to absorb the weight of said piston, piston rod and clamping means when said test bar is in engagement with said test ring.

References Cited in the file of this patent

UNITED STATES PATENTS

| | | |
|---|---|---|
| 895,980 | Derihon | Aug. 11, 1908 |
| 2,132,347 | Anderson | Oct. 4, 1938 |
| 2,370,606 | Morgan | Feb. 27, 1945 |
| 2,606,092 | Rich | Aug. 5, 1952 |

FOREIGN PATENTS

| | | |
|---|---|---|
| 15,270 | Great Britain | Aug. 25, 1892 |